US012613840B2

(12) United States Patent
Ajzenman et al.

(10) Patent No.: US 12,613,840 B2

(45) Date of Patent: Apr. 28, 2026

(54) SYNTHETIC DATA GENERATION

(71) Applicant: Snowflake Inc., Menlo Park, CA (US)

(72) Inventors: Gustavo Ajzenman, Albany, CA (US); Khalid Zaman Bijon, Santa Cruz, CA (US); Monica J. Holboke, Toronto (CA); Jeremy Marcell McGee, San Francisco, CA (US)

(73) Assignee: Snowflake Inc., Menlo Park, CA (US)

( * ) Notice: Subject to any disclaimer, the term of this patent is extended or adjusted under 35 U.S.C. 154(b) by 0 days.

(21) Appl. No.: 18/958,922

(22) Filed: Nov. 25, 2024

(65) Prior Publication Data

US 2026/0037484 A1 Feb. 5, 2026

Related U.S. Application Data

(60) Provisional application No. 63/677,796, filed on Jul. 31, 2024.

(51) Int. Cl.
 *G06F 16/21* (2019.01)
 *G06F 16/2453* (2019.01)

(52) U.S. Cl.
 CPC ...... *G06F 16/211* (2019.01); *G06F 16/24544* (2019.01)

(58) Field of Classification Search
 CPC .......................... G06F 16/211; G06F 16/24544
 See application file for complete search history.

(56) References Cited

U.S. PATENT DOCUMENTS

2023/0024796 A1* 1/2023 Hazard .................... G06N 5/04
2025/0156631 A1* 5/2025 Sharma ................... G06F 40/20

OTHER PUBLICATIONS

An, Seunghwan, "Distributional Learning of Variational AutoEncoder Application to Synthetic Data Generation", Department of Statistical Data Science, University of Seoul, S. Korea, 2023, 27 pages.
Benali, Fodil, "MTCopula Synthetic Complex Data Generation Using Copula", [Online]. Retrieved from the Internet https ceur-ws.org vol. 2840 paper8.pdf, 2021, 10 pages.
Bond-Taylor, Sam, "Deep Generative Modeling a Comparative Review of VAEs, GANs, Normalizing Flows, Energy-Based and Autoregressive Models", IEEE Transactions on Pattern Analysis and Machine Intelligence, Mar. 28, 2022, 20 pgs.
Cai, Kuntai, "Data Synthesis via Differentially Private Markov Random Fields", Proceedings of the VLDB Endowment, vol. 14, No. 11 ISSN, pp. 2190-2202, 2021, 13 pgs.
Czado, Claudia, "Dependence Modelling in Ultra High Dimensions with Vine Copulas", https web.archive.org web 20240423124427if_ https mediatum.ub.tum.de doc 1439506 1439506.pdf, Wayback Machine snapshot Apr. 23, 2024, 2 pages.

(Continued)

*Primary Examiner* — Ajay M Bhatia
*Assistant Examiner* — Cindy Nguyen
(74) *Attorney, Agent, or Firm* — Schwegman Lundberg & Woessner, P.A.

(57) ABSTRACT

Various embodiments described herein provide for systems, methods, devices, instructions, and like for generating synthetic data. According to various embodiments, synthetic data generation comprises receiving input specifying one or more source tables and join key columns, and generating synthetic data that preserves statistical similarity and referential integrity among columns of the source data.

20 Claims, 8 Drawing Sheets

(56) References Cited

OTHER PUBLICATIONS

DataCebo, "SDV the Synthetic Data Vault", [Online]. Retrieved from the Internet https web.archive.org web 20240708022619 https sdv.dev , Wayback Machine snapshot Jul. 8, 2024, 7 pages.

DataCebo, "Copulas Synthetic Data Vault Copulas", [Online]. Retrieved from the Internet https web.archive.org web 20240103152326 https sdv.dev Copulas index.html, Wayback Machine snapshot Jan. 3, 2024, 2 pages.

DataCebo Introducing Constraint, "Synthetic data for Enterprise", [Online]. Retrieved from the Internet https web.archive.org web 20240718214512 https datacebo.com , Wayback Machine snapshot Jul. 18, 2024, 4 pages.

Gambs, Sébastien, "Growing synthetic data through differentially-private vine copulas", Proceedings on Privacy Enhancing Technologies 3, pp. 122-141, 2021, 20 pgs.

Giomi, Matteo, "A Unified Framework for Quantifying Privacy Risk in Synthetic Data", Proceedings on Privacy Enhancing Technologies, Quantifying Privacy Risk in Synthetic Data, pp. 312-328, 2023, 17 pgs.

GitHub, "The Synthetic Data Vault. Put synthetic data to work", [Online]. Retrieved from the Internet https web.archive.org web 20240423043031 https github.com sdv-dev Copulas, Wayback Machine snapshot Apr. 23, 2024, 5 pages.

GitHub, "Distributional Variational AutoEncoder Application to Synthetic Data Generation", [Online]. Retrieved from the Internet https web.archive.org web 20240416061615 https github.com an-seunghwan DistVAE, Wayback Machine snapshot Apr. 16, 2024, 3 pages.

GitHub, "Copula-Shirley", [Online]. Retrieved from the Internet https web.archive.org web 20241204125417 https github.com alxxrg copula-shirley, Wayback Machine snapshot Dec. 4, 2024, 3 pages.

GitHub, "DPCopula", [Online]. Retrieved from the Internet https web.archive.org web 20240420055334 https github.com Emory-AIMS DPCopula, Wayback Machine snapshot Apr. 20, 2024, 2 pages.

GitHub, "Privbayes-Implementation Privacy-Preserving Data Release Using Bayesian Networks", [Online]. Retrieved from the Internet https github.com 0hex7 Privbayes-Implementation, Accessed on Nov. 30, 2025, 4 pages.

Granville, Vincent, "Chapter 10 of Synthetic Data and Generative AI", Version 4.0, Mar. 2023, 39 pgs.

Gretel.AI, "Evaluate", [Online]. Retrieved from the Internet https web.archive.org web 20250512020041 https docs.gretel.ai create-synthetic-data safe-synthetics evaluate, Wayback Machine snapshot May 12, 2025, 3 pages.

Gretel.AI, "Synthetic Quality and Privacy Report", [Online]. Retrieved from the Internet https web.archive.org web 20250512022716mp_ https docs.gretel.ai create-synthetic-data safe-synthetics evaluate synthetic-quality-privacy-report, Wayback Machine snapshot May 12, 2025, 13 pages.

Gretel.AI, "Tips to Improve Synthetic Data Quality", [Online]. Retrieved from the Internet https docs.gretel.ai create-synthetic-data safe-synthetics evaluate tips-improve-synthetic-data-accuracy, Wayback Machine snapshot May 12, 2025, 6 pages.

Haddad, Faris, "How to evaluate the quality of the synthetic data measuring from the perspective of fidelity, utility, and privacy", Artificial Intelligence, Dec. 16, 2022, 8 pgs.

Hittmeir, Markus, "A Baseline for Attribute Disclosure Risk in Synthetic Data", Proceedings of the Tenth ACM Conference on Data and Application Security and Privacy, 2020, 11 pgs.

Lamberti, Aldo, "How to evaluate synthetic data quality", Gartner recognizes us as Sample Vendor for 'Data, Analytics and AI', Mar. 3, 2023, 15 pgs.

Li, Haoran, "Differentially Private Synthesization of Multi-Dimensional Data using Copula Functions", Adv Database Technol, pp. 475-486, 2014, 38 pgs.

Mckenna, Ryan, "Winning the NIST Contest a scalable and general approach to Differentially Private Synthetic Data", arXiv2108. 04978v1 cs.CR, [Online] Retrieved from the internetarXiv2108. 04978v1 [cs.CR], Aug. 11, 2021, 27 pages.

Meyer, David, "Copula-based synthetic data generation for machine learning emulators in weather and climate application to a simple radiation model", [Online]. Retrieved from the Internet https doi.org 10.5194 gmd-2020-427, Access on Jan. 5, 2021, 21 pages.

Mostly AI, "Data Access and Data Insights for Everyone", [Online]. Retrieved from the Internet https web.archive.org web 20240715091405 https mostly.ai , Wayback Machine snapshot Jul. 15, 2024, 12 pages.

Nagler, Thomas, "Model selection in sparse high-dimensional vine copula models with application to portfolio risk", arXiv1801. 09739v3 stat.ME, [Online] Retrieved from the internetarXiv1801. 09739v3, Nov. 19, 2018, 23 pages.

Nvidia, "The synthetic data platform purpose-built for AI Gretel.ai", Explore SDG for Agentic AI[Online]. Retrieved from the Internet https www.nvidia.com en-us use-cases synthetic-data-generation-for-agentic-ai , Accessed on Nov. 30, 2025, 9 pages.

Platzer, Michael, "Holdout-Based Empirical Assessment of Mixed-Type Synthetic Data", Frontiers, [Online] Retrieved from the internetdoi10.3389 fdata.2021.679939, Jun. 29, 2021, 12 pgs.

Restrepo, Juan P, "Nonparametric Generation of Synthetic Data Using Copulas", Electronics 2023, 12, Mar. 29, 2023, 17 pages.

SciKit-Learn 1.7.2 Documentation, "LabelEncoder", [Online]. Retrieved from the Internet https web.archive.org web 20240803192435 https scikit-learn.org stable modules generated sklearn.preprocessing. LabelEncoder.html, Wayback Machine snapshot Aug. 3, 2024, 5 pages.

SciPy, "ks_2samp SciPy v1.16.2 Manual", [Online]. Retrieved from the Internet https web.archive.org web 20240712111440 https docs. scipy.org doc scipy reference generated scipy.stats.ks_2samp. html#scipy-stats-ks-2samp, Wayback Machine snapshot Jul. 12, 2024, 5 pages.

SDMetrics, "ContingencySimilarity", [Online]. Retrieved from the Internet https docs.sdv.dev sdmetrics data-metrics quality contingencysimilarity, Accessed on Nov. 30, 2025, 5 pages.

SDMetrics, "Quality Report", [Online]. Retrieved from the Internet https docs.sdv.dev sdmetrics data-metrics quality quality-report, Accessed on Nov. 30, 2025, 6 pgs.

Sun, Yi, "Learning Vine Copula Models for Synthetic Data Generation", The Thirty-Third AAAI Conference on Artificial Intelligence AAAI-19, pp. 5049-5057, 2019, 9 pgs.

Tao, Yuchao, "Benchmarking Differentially Private Synthetic Data Generation Algorithms", arXiv2112.09238v2 cs.CR, [Online] Retrieved from the internethttps arxiv.org pdf 2112.09238, Feb. 15, 2022, 6 pages.

Tonic.AI Synthetic Data Solutio, "Secure data transformation for software and AI developers", [Online]. Retrieved from the Internet https web.archive.org web 20240704031558 https www.tonic.ai , Wayback Machine snapshot Jul. 4, 2024, 5 pages.

Zhang, Jun, "PrivBayes Private Data Release via Bayesian Networks", ACM Transactions on Database Systems, 424, Article 25, 2017, 1-41.

Zhao, Zilong, "CTAB-GAN Effective Table Data Synthesizing", Proceedings of Machine Learning Research 157, ACML 2021, 2021, 16 pgs.

* cited by examiner

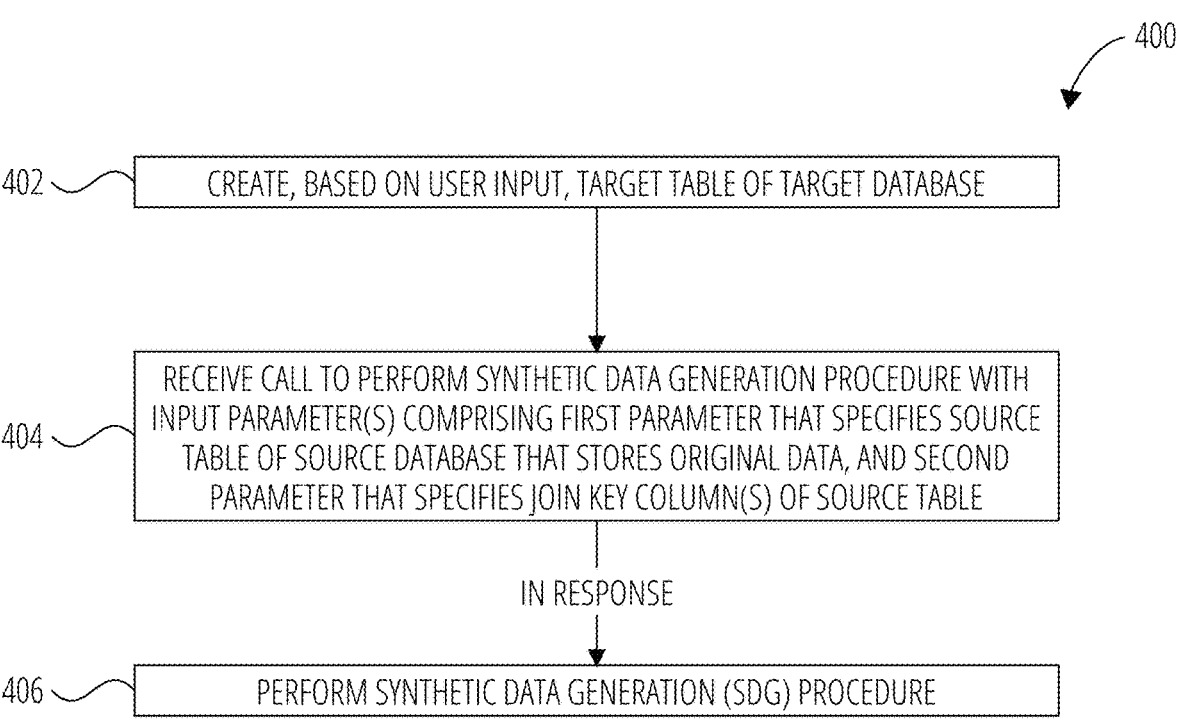

402 — CREATE, BASED ON USER INPUT, TARGET TABLE OF TARGET DATABASE

404 — RECEIVE CALL TO PERFORM SYNTHETIC DATA GENERATION PROCEDURE WITH INPUT PARAMETER(S) COMPRISING FIRST PARAMETER THAT SPECIFIES SOURCE TABLE OF SOURCE DATABASE THAT STORES ORIGINAL DATA, AND SECOND PARAMETER THAT SPECIFIES JOIN KEY COLUMN(S) OF SOURCE TABLE

IN RESPONSE

406 — PERFORM SYNTHETIC DATA GENERATION (SDG) PROCEDURE

SYNTHETIC DATA GENERATION

CROSS-REFERENCE TO RELATED APPLICATIONS

This application claims priority to and the benefit of U.S. Provisional Patent Application No. 63/677,796, entitled "SYNTHETIC DATA GENERATION FOR TABULAR DATA," filed on Jul. 31, 2024, which is incorporated herein by reference in its entirety.

TECHNICAL FIELD

Embodiments described herein relate to data systems and, more particularly, to systems, methods, devices, and instructions for generating synthetic data.

BACKGROUND

Synthetic data represents an important capability to help data platform users maximize the value of sensitive data. Within the synthetic data domain, users have a spectrum of options ranging from "fake data" generated purely from dataset types and bounds to synthetic data that mimics original tables well enough to serve as a stand-in for the original data (e.g., original production data) in artificial intelligence (AI) and machine learning (ML) tasks, application development, or testing workflow.

BRIEF DESCRIPTION THE DRAWINGS

Various ones of the appended drawings merely illustrate various embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 4 and FIG. 5 are flowcharts of example methods for generating synthetic data, according to some example embodiments of the present disclosure.

DETAILED DESCRIPTION

Figure 1:
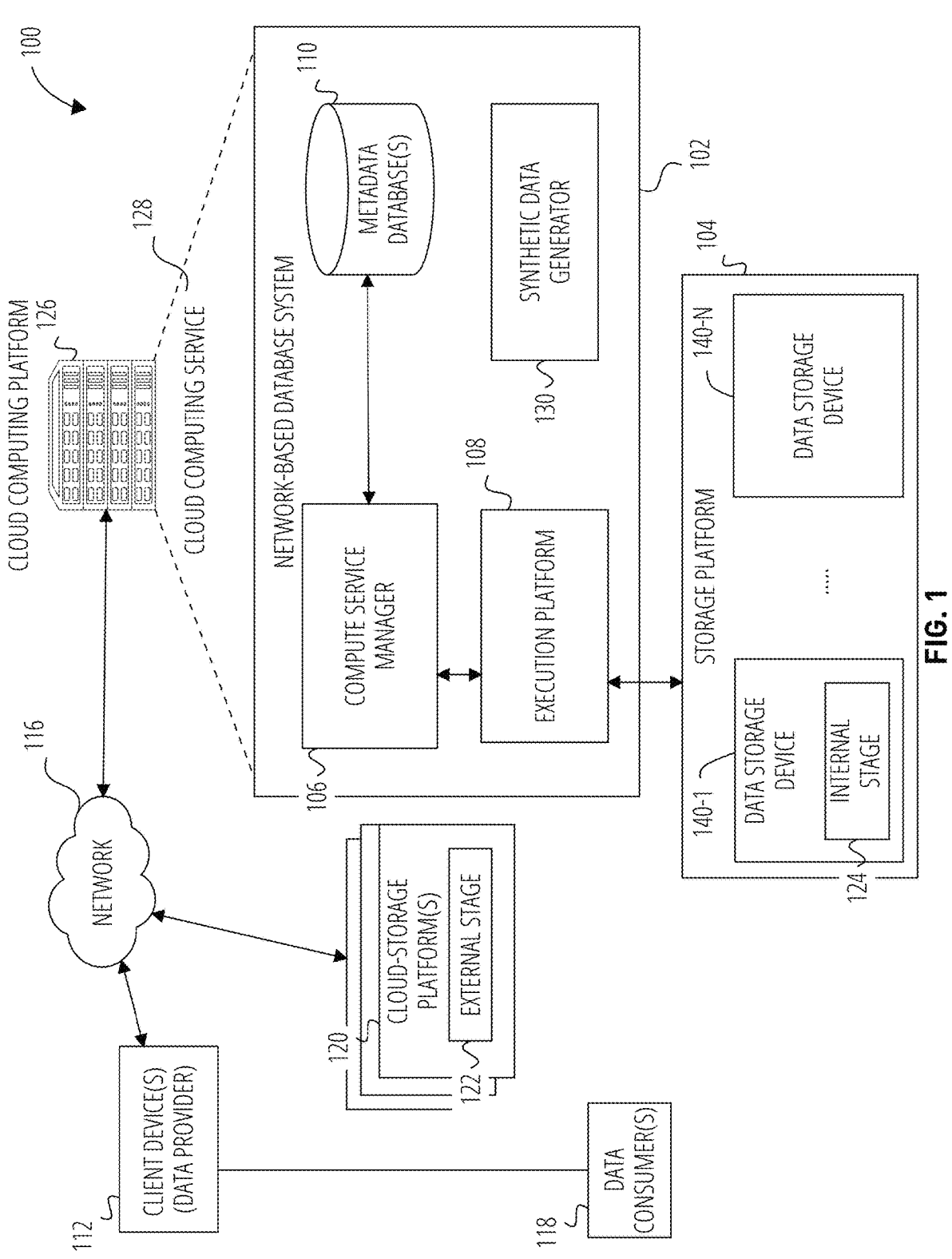
FIG. 1 illustrates an example computing environment comprising a database system in the example form of a network-based database system that includes a synthetic data generator, according to some embodiments of the present disclosure.

Reference will now be made in detail to specific embodiments for carrying out the inventive subject matter.

Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In certain use cases, users can benefit from creating a data table that mimics the statistical properties of an original data table (which can store sensitive data, such as PII data) but that is not bound by the same regulatory and compliance requirements as the original data table. The most common use case definition is the creation of synthetic data in lower environments, such as development and testing environments. For example, a "prod-to-test" use case can be fit for synthetic data given the lower environments are more permissive in their access controls than production environments as well as need to satisfy the regulatory and compliance requirements outlined above. As used herein, synthetic data can comprise new data (e.g., new tabular data) artificially generated (e.g., artificially reproduced) based on original data (e.g., original tabular data, which can comprise such sensitive data as PII data) from an existing, source table (e.g., source data table), where the new data is different from the original data but still preserves statistical similarity to the original data and still preserves referential integrity of the new data. The original or source data can also be considered/ referred to herein as non-synthetic data. In comparison, fake data can comprise data generated without reference to an existing data table. Synthetic data can align with data privacy's goal of unlocking the use of existing data, whether sensitive or not sensitive.

Various embodiments described herein provide for systems, methods, devices, instructions, and like for generating synthetic data (e.g., tabular data). According to various embodiments, synthetic data generation comprises receiving input specifying one or more source tables and join key columns, and generating synthetic data that preserves statistical similarity and referential integrity among columns of the source data. Synthetic data generated by various embodiments can preserve format (e.g., phone number or name in the original data should look like phone number or name, respectively). Synthetic data generated by various embodiments can preserve artificial intelligence (AI)/machine learning (ML)-level fidelity, where training or inference on generated synthetic data should yield similar results to the original dataset (from which the synthetic data is generated). This can also be interpreted as a utility requirement. Additionally, synthetic data generated by various embodiments can preserve privacy.

Various embodiments comprise using a synthetic data generation (SDG) procedure configured to receive production tables as input, generate synthetic data, and insert the synthetic data into target tables in a development environment. The SDG procedure can be implemented as a stored procedure on a data system (e.g., a network-based database system). The SDG procedure can comprise an algorithm to produce synthetic data and publish quality reports for the generated data.

According to some embodiments, synthetic data generation comprises one or more of extracting non-key columns, fitting a model and generating data, enforcing privacy constraints, and preserving join keys. The synthetic data generation can comprise computing univariate distributions for each column, computing the correlation matrix of the input data, or sampling a multivariate distribution to produce synthetic data. Depending on the embodiment, a core generator can be used for the synthetic data generation, such as Copulas, which can capture univariate distributions of attributes and correlations across them, thereby providing flexibility and working well for high-dimensional complex data. The synthetic data generation can comprise generating quality metrics to assess the synthetic data. These metrics can include, without limitation, fidelity measures to evaluate how well the statistics in the synthetic data match those of the original data, and privacy measures such as Distance to Closest Record (DCR) and Nearest Neighbor Distance Ratio (NNDR) to ensure the synthetic data protects original records from being compromised. Various embodiments comprise generating a quality report that highlights key differences between the original and synthetic datasets, allowing users to validate the quality of the generated synthetic data. Some embodiments support various data types including, without limitation, numeric, Boolean, date/time, and categorical data. Additionally, various embodiments handle referential integrity by generating a synthetic key mapping that applies a unique value for each unique key value across the input tables.

As used herein, referential integrity can refer to the ability to join synthetic datasets using the same columns as original data tables. Statistical similarity can refer to the maintenance of correlations within a data table. Statistical similarity can refer to the maintenance of one or more correlations across different data tables. AI/ML-level fidelity can refer to the maintenance of training or inference data between original data and synthetic data.

Various embodiments assist a user (e.g., customer) in synthesizing, from existing production datasets (e.g., storing confidential data), test datasets to be used in analytics in lower, non-production environments. The data synthesis can be part of a process or workflow referred to as a "prod-to-test." A prod-to-test process/workflow can take customer production data and generate synthetic data that preserves statistical similarity and referential integrity among the columns of the production data. A prod-to-test process/workflow can report quality metrics of the generated synthetic data for the user (e.g., customer) validation. A prod-to-test process/workflow can enforce certain privacy metrics to ensure the generated synthetic data has preserved privacy. A user (e.g., customer) can use the prod-to-test process/workflow to systematically create test data, which is similar to original production data, and to share synthetic data instead of actual production data with masking policy protection to hide sensitive information.

Reference will now be made in detail to various embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes a synthetic data generator 130, according to some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some embodiments, metadata database 110 is configured to store account object metadata (e.g., account objects used in connection with a replication group object).

Figure 3:
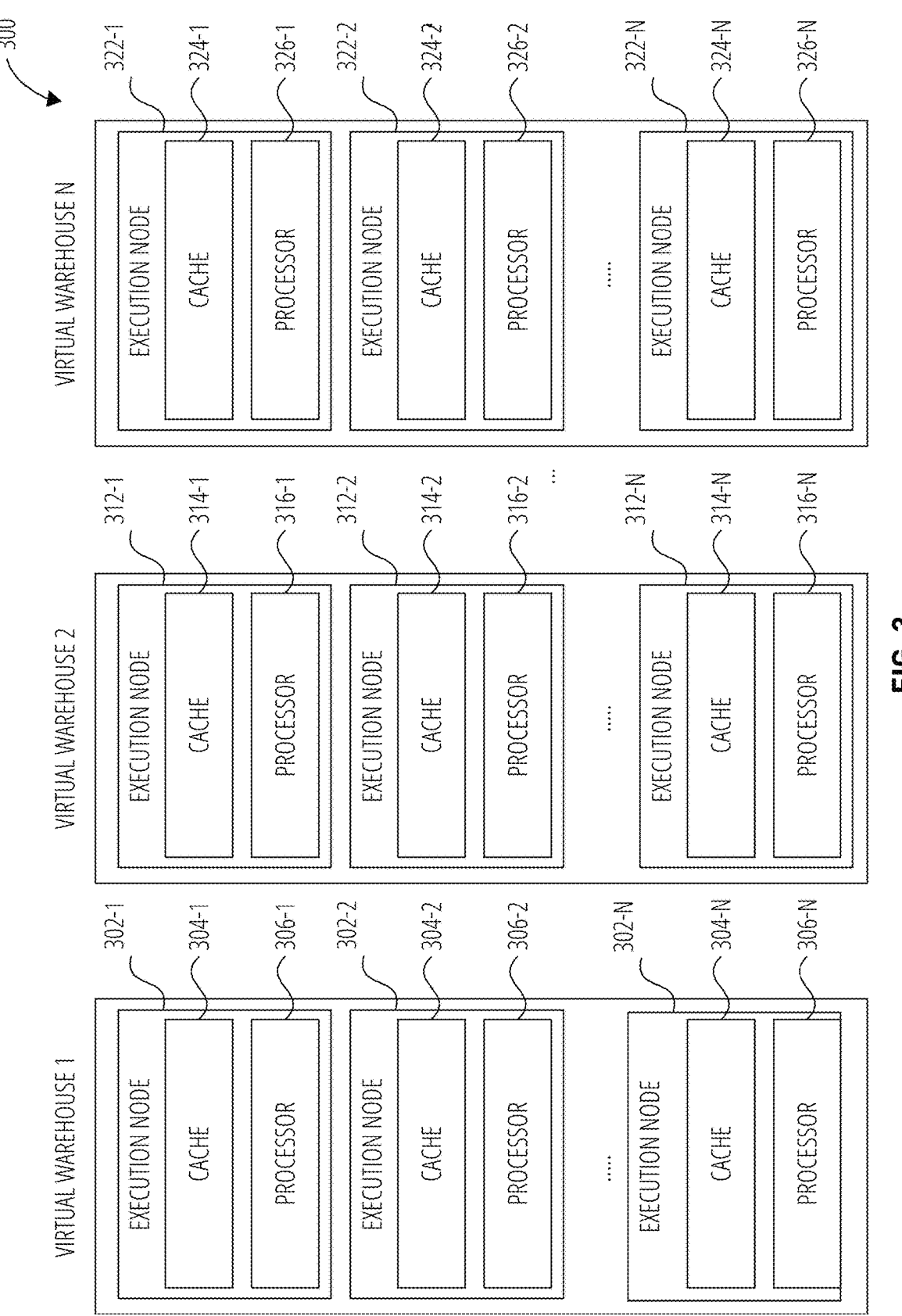
FIG. 3 is a block diagram illustrating components of an execution platform, according to some embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 124 may reside on one or more of the data storage devices 140-1-140-N, and at least one external stage 122 may reside on one or more of the cloud-storage platforms 120.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises the synthetic data generator 130, which implements synthetic data generation in accordance with various embodiments described herein.

Figure 2:
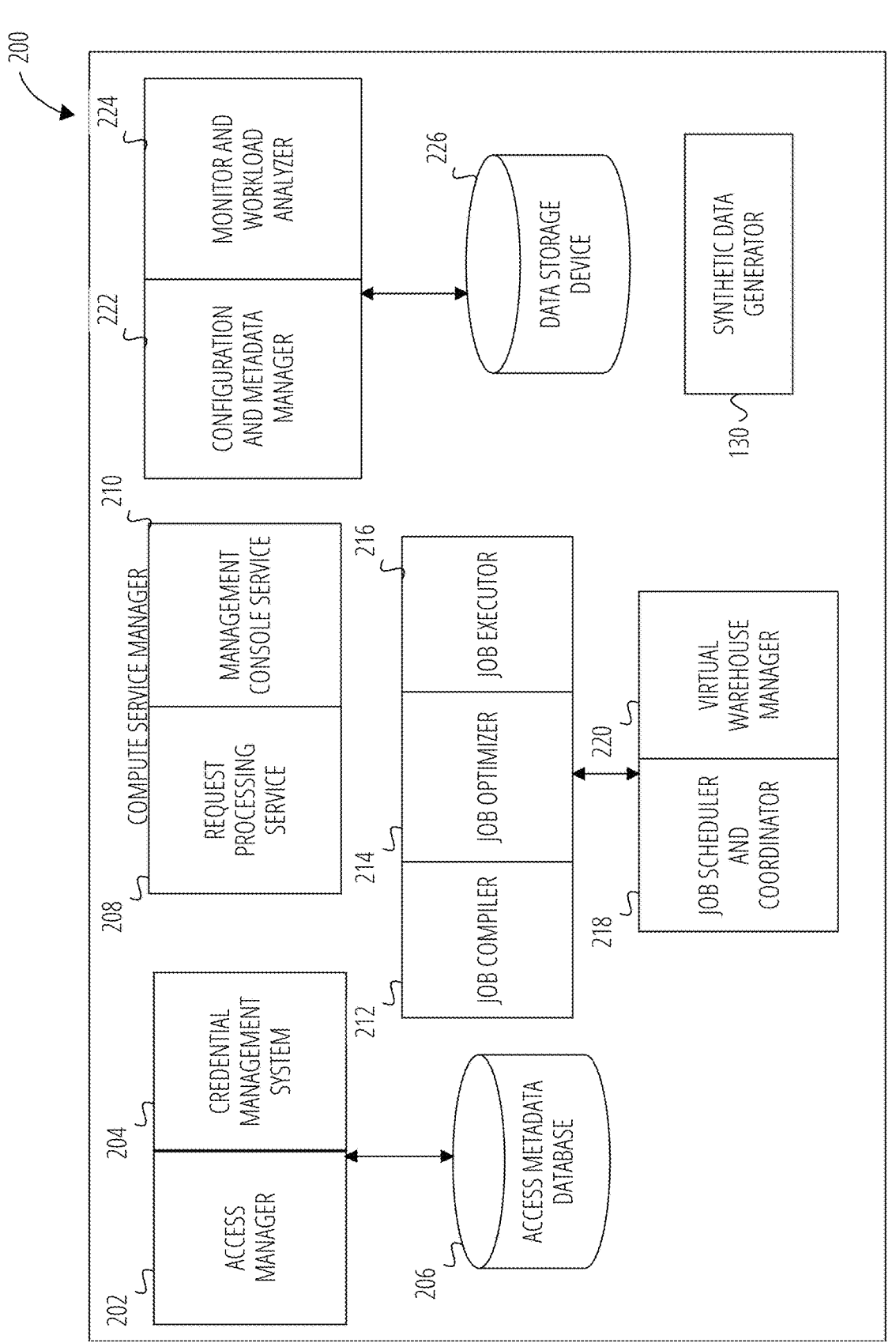
FIG. 2 is a block diagram illustrating components of a compute service manager, according to some embodiments of the present disclosure.

FIG. 2 is a block diagram 200 illustrating components of the compute service manager 106, according to some embodiments of the present disclosure. As shown in FIG. 2, the compute service manager 106 includes an access manager 202 and a credential management system 204 coupled to access access metadata database 206, which is an example of the metadata database(s) 110. Additionally, as shown in FIG. 2, the compute service manager 106 can include (and support) the synthetic data generator 130 of various example embodiments.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service execution platform 108 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, according to some embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 5:
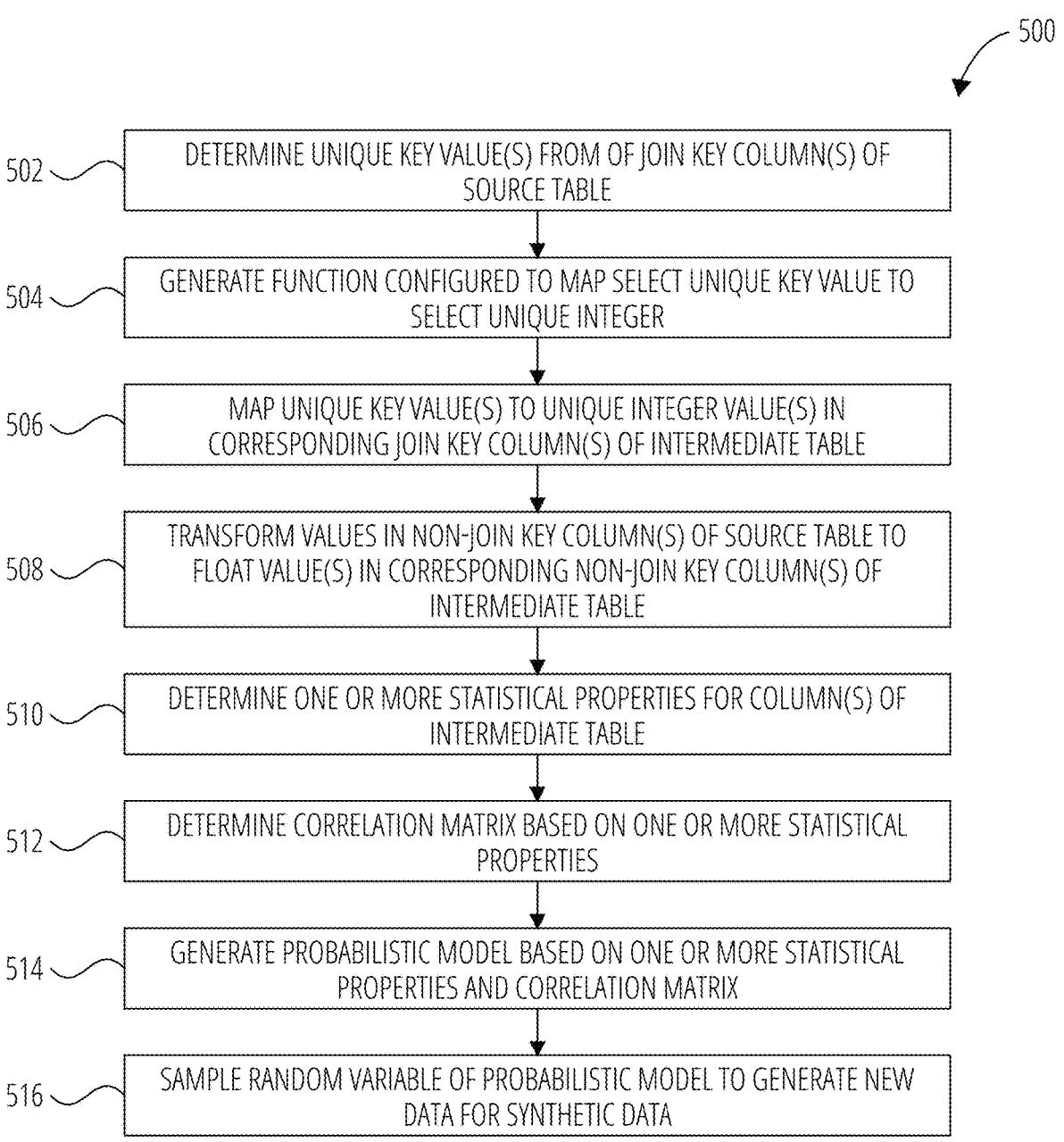

FIG. 4 and FIG. 5 are flowcharts of example methods 400, 500 for generating synthetic data, according to some example embodiments of the present disclosure. Any of methods 400, 500 may be embodied in computer-readable instructions for execution by one or more hardware components (e.g., one or more processors) such that the operations of methods 400, 500 can be performed by components of the synthetic data generator 130 or the network-based database system 102, such as a network node (e.g., the synthetic data generator 130 executing on a network node of the compute service manager 106) or a computing device (e.g., client device 112), one or both of which may be implemented as machine 800 of FIG. 8 performing the disclosed functions. Accordingly, methods 400, 500 are described below, by way of example with reference thereto. However, it shall be appreciated that any of methods 400, 500 may be deployed on various other hardware configurations and is not intended to be limited to deployment within the network-based database system 102.

At operation 402, a processor (e.g., implementing the synthetic data generator 130) creates (e.g., generates or establishes) a target table of a target database. The target table can be used to store at least a portion of synthetic data generated by method 400, and the target database can reside in a development or testing computing/software environment (rather than a production or live environment) that a user (e.g., developer or user) uses for data/software development or testing. For various example embodiments, the target table is intended to store synthetic data (e.g., development or test data) to be generated by method 400 based on original data (actual data from a source table of a source database, which may be in a production environment). The target table can be generated (e.g., created or set up) based on user input, such as input from an administrative or development user, which can be received by way of a graphical user interface or a command line interface.

During operation 404, the processor receives a call to perform a synthetic data generation (SDG) procedure with a set of input parameters (e.g., arguments to the SDG procedure). The call can originate locally (e.g., on the network-based database system 102) or from a client device, such as client device 112. For various example embodiments, the set of input parameters comprises a first parameter that specifies a source table of a source database that stores original data to be used to generate the synthetic data, and a second parameter that specifies a set of join key columns of the source table to be used to generate the synthetic data. Additionally, the set of input parameters can comprise a third parameter that specifies the target table of the target database. According to some example embodiments, at least a portion of the set of input parameters is passed (or provided) to the synthetic data generation procedure as input, which can comprise a data structure such as an array (e.g., JSON array object). For instance, a JSON array object provided as input to the synthetic data generation procedure can specify a configuration for each source table that will provide original data (e.g., actual data), each (corresponding) target table to store synthetic data based on the original data, and each corresponding join key column (e.g., a column whose values would be uniquely encoded to a value in the synthetized data). The source table can store original data, such as actual, real, or production data, and the source database can reside in a production or live computing/software environment (rather than a development or test environment) that a user (e.g., customer) uses for non-development or non-testing purposes.

In response to the call, at operation 406, the processor performs the synthetic data generation procedure. According to various example embodiments, the synthetic data generation procedure comprises the processor accessing at least a portion of the original data from the source table, and the processor generating synthetic data that comprises new data artificially generated based on the original data and the set of join key columns. For some example embodiments, the new data is artificially generated such that the new data is different from the original data while preserving statistical similarity to the original data and while preserving referential integrity of the new data among columns of the original data. Further, for some example embodiments, the synthetic data generation procedure comprises logic (e.g., synthetic logic) that detects confidential data, such as PII data (e.g., name, e-mail address, social security number, etc.), within a column of the source table and masking, redacting, or replacing (e.g., with fake data) the confidential data in a corresponding column of the target table. The logic can detect confidential data in a column by, for example, determining how many unique values are in a column (e.g., non-join key column) given the volume/size of the source table. An example of the logic and the masking or redaction is illustrated and described herein with respect to Table 1 and FIG. 6. One or more columns in the target table corresponding to one or more columns of the source table that store confidential data, the one or more columns in the target table can be tagged or classified (e.g., as confidential or PII data) accordingly. For various example embodiments, the synthetic data generation procedure eventually stores the generated synthetic data in the target table of the target database based on (e.g., according to) the set of join key columns. The original data can comprise data formatted in table format (e.g., tabular data), and the synthetic data generated can comprise data formatted in table format (e.g., tabular data). Additionally, the synthetic data generation procedure can generate a set of quality metrics for the synthetic data generated by the synthetic data generation procedure based on the original data. The synthetic data generation procedure can return to the caller of the synthetic data generation procedure (e.g., to the client device) the set of quality metrics, which can be in the form of a metric table. The set of metrics can include, without limitation, a set of fidelity measures to evaluate how well statistics in the synthetic data match statistics in the original data, and a set of privacy measures, which can ensure the synthetic data protects original records from being compromised. The set of privacy measures can comprise at least one of a Distance to Closest Record (DCR) or a Nearest Neighbor Distance Ratio (NNDR). a match could be: same correlation coefficients between the columns of the source and synthetic data. FIG. 7 illustrates example correlation coefficient differences between synthetic data and original data.

Referring now to FIG. 5, method 500 can represent an example of how synthetic data is artificially generated based on the original data and the set of join key columns. Method 500 can be performed as part of the synthetic data generation procedure (e.g., during operation 406 of method 400).

At operation 502, a processor determines a set of unique key values from the set of join key columns of the source table. During operation 504, the processor generates a function configured to map a select unique key value to a select unique integer. At operation 506, the processor maps the set of unique key values to a set of unique integer values in a set of corresponding join key columns of an intermediate table. For various example embodiments, operation 506 is performed using the function generated during operation 504. For join-key columns, operation 506 can use a label-encoding system that maps each value of the join-key to a unique label. With this approach, the referential integrity and uniqueness properties can be maintained. For number, categorical, Boolean columns, operation 506 can use a copula-based generation approach to ensure the synthetic data preserves various statistical properties (e.g., correlation coefficients, etc.). Thereafter, at operation 508, the processor transforms values in one or more non-join key columns of the source table to float values in one or more corresponding non-join key columns of the intermediate table. The processor, at operation 510, determines one or more statistical properties for one or more columns of the intermediate table. For instance, operation 510 can comprise determining a univariate statistical property, multivariate statistical property, or both, which can be determined by computing univariate distributions for each column. During operation 512, the processor determines a correlation matrix based on the one or more statistical properties and, at operation 514, the processor generates a probabilistic model based on the one or more statistical properties and the correlation matrix. Eventually, at operation 516, the processor samples a random variable of the probabilistic model to generate new data for synthetic data. All columns containing generated synthetic data can be inserted into the output table. Depending on the example embodiment, the probabilistic model can comprise a copula. Additionally, fidelity metrics, like correlation coefficient difference, can be computed to show/indicate the quality of the generation.

Figure 6:
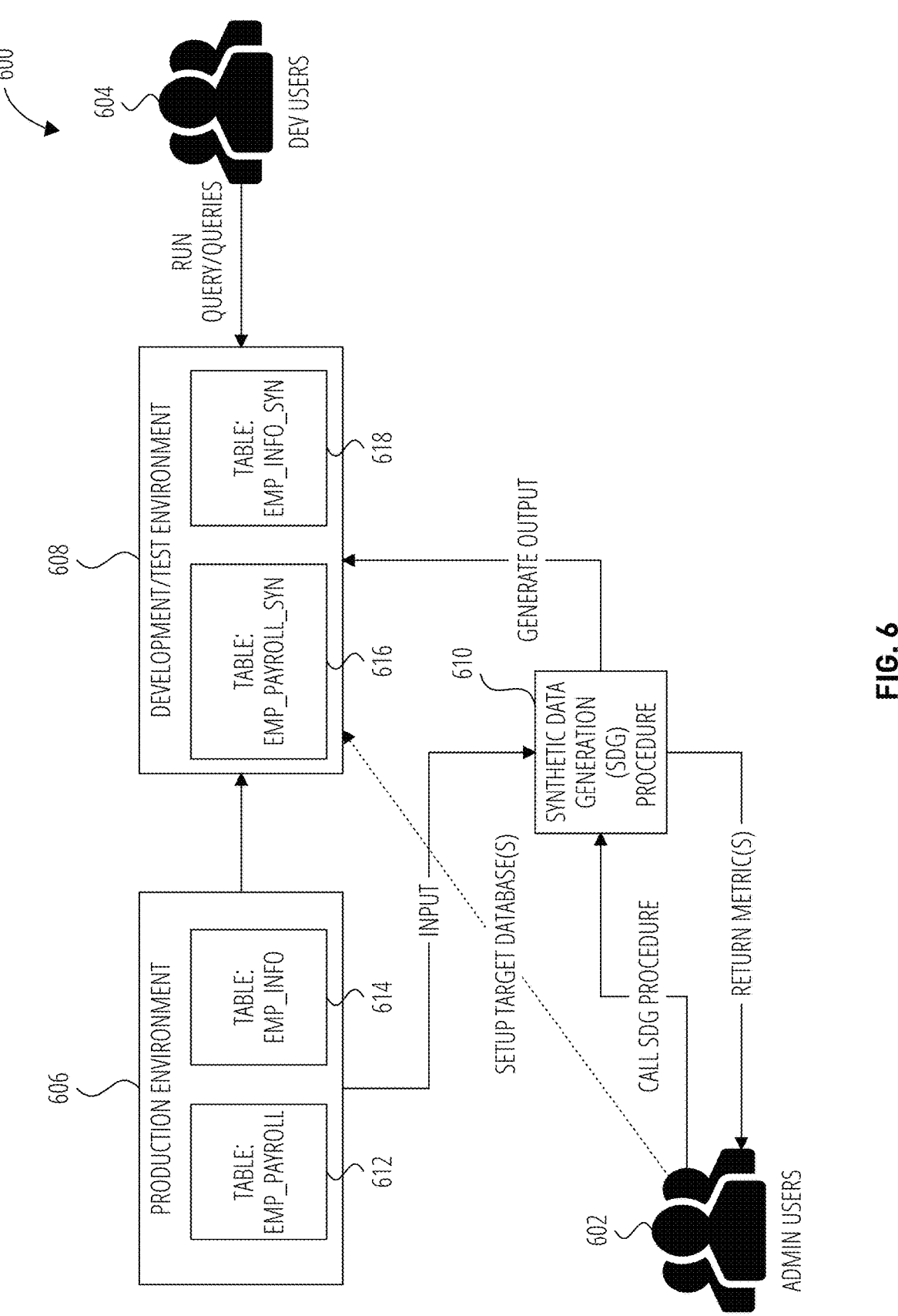
FIG. 6 is a flow diagram illustrating an example of a production-to-test process/workflow, according to some embodiments of the present disclosure.
Figure 7:
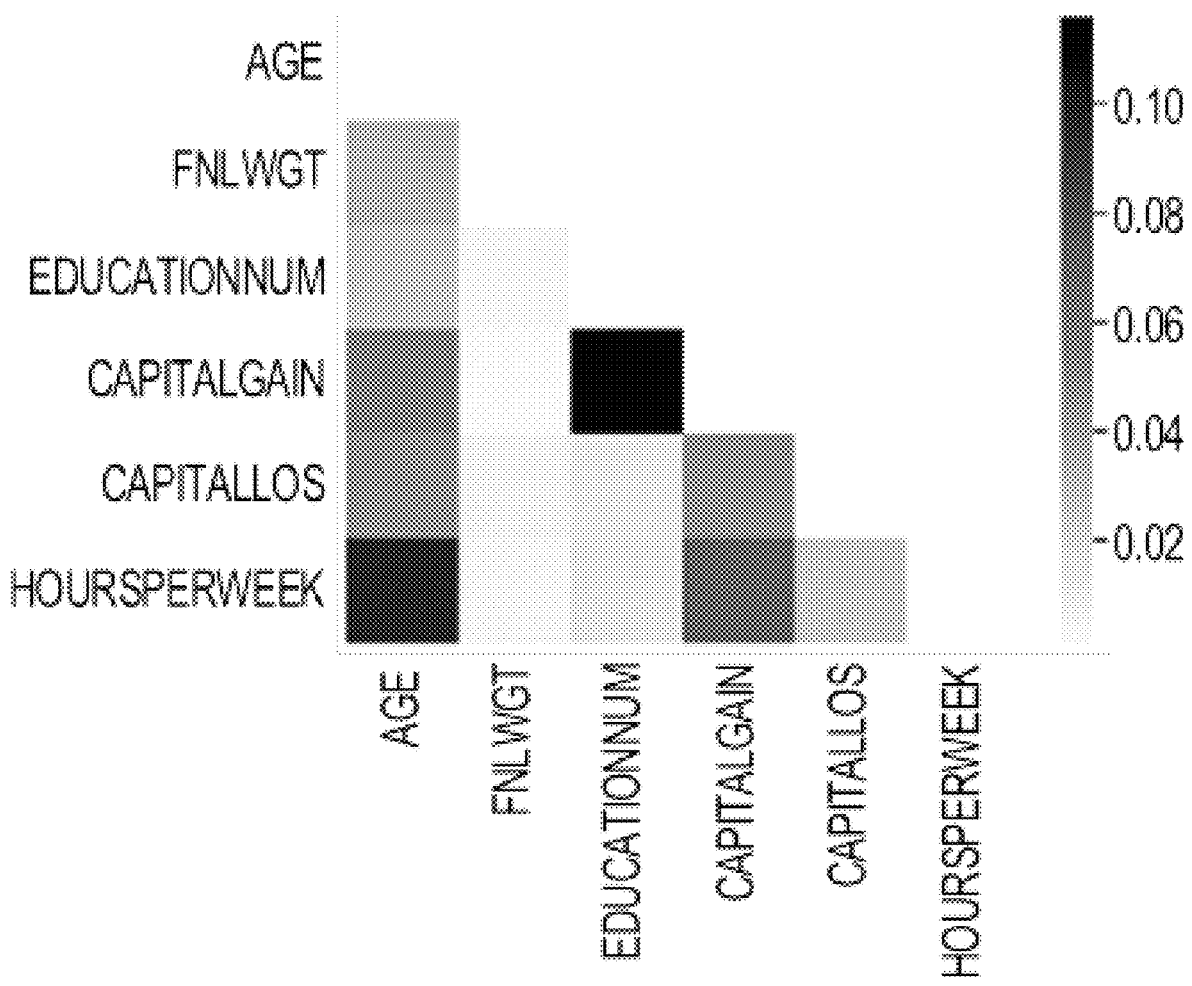
FIG. 7 illustrates a correlation heatmap representing example correlation coefficient difference metrics, according to some embodiments of the present disclosure.

FIG. 6 is a flow diagram illustrating an example of a production-to-test process/workflow 600, according to some embodiments of the present disclosure. FIG. 6 illustrates a production environment 606 that comprises one or more data tables that store production data on which a production user can run certain SQL workloads (e.g., queries), and a development/test environment 608 that represents a similar artifact of the production environment 606, which comprises one or more data tables that store synthetic data on which a user (e.g., one of the development users 604) can run production-like SQL workloads (e.g., queries). A user (e.g., one of the administrative users 602) sets up development tables where synthetic data is to be stored, and calls Synthetic Data Generation (SDG) Procedure 610 with proper input. The SDG procedure 610 takes production data tables of the production environment 606 as input, and generates synthetic data for them and inserts the synthetic data to the development tables of the development/test environment 608. The SDG procedure 610 generates and returns metrics that an administrative user can verify to determine the quality of the synthetic data. The metrics can be returned as part of an SDG Quality Report View, which can comprise a view in a database that reports the quality of the synthetic data. For some embodiments, a utility function SDG workload generator can take a production query and can generate queries to produce development artifacts using synthetic data, which can reduce the manual process of generating input for the SDG procedure 610.

The SDG procedure 610 can comprise a managed system procedure that: implements an algorithm (e.g., SDG algorithm) to produce synthetic data; and publishes quality reports for the generated synthetic data. The algorithm can use Copulas, or the like, for as the core synthetic data generator. SDG quality report comprises (e.g., describes) one or more metrics can assist a user understand how well the synthetic data fits the use case for which it was produced. For instance, the SDG quality report can comprise privacy metrics, such distance to closest record (DCR) or nearest neighbor distance (NNDR) at the time of SDG. In another instance, the SDG quality report can comprise fidelity metrics, which can highlight the key differences between the original and synthetic datasets (which can result in lower quality for workloads performed on the synthetic data). To communicate this, various embodiments compare the correlation coefficients between the synthetic and original tables. One or more metrics can be calculated as part of the synthetic data generation process. Additionally, metrics determined for synthetic data can be used to generate an SDG quality report (e.g., SDG quality report schema) and can be returned as output from the SDG procedure 610. The SDG procedure 610 can report the quality of the generation (e.g., an SDG quality report) as an output table of a call to the SDG procedure 610.

With respect to data type considerations, during generation of synthetic data (from original data), various embodiments infer categorical data types from Strings as outlined below in Table 1.

TABLE 1

| Column Data Type | Synthesize Logic |
|---|---|
| Numeric/Boolean/ Date/Time | Always synthesize unless JOIN Key, no special treatment required |
| String (categorical can be discovered based on cardinality; or can use an enum datatype or a new tag to classify a column as category) | If column specified as JOIN key (possible identifier) encode to maintain referential integrity else this categorical if cardinality ≤ (number of rows)/2 synthesize else replace with **redacted** (in the future preserve format of these columns) |
| Others (binary/ Semi-Structured/ Geospatial) | Replace values with NULL (also document that they are not supported) |

The following describes an example user experience while interacting with some embodiments. The production environment 606 can comprise the following data tables (in Table 2 and Table 3), where the Department column of data table Employee_Info can have multiple (e.g., 20) distinct value)

TABLE 7

| Data Table: Employee_Payroll | | | |
|---|---|---|---|
| ID | Base | Bonus | Stock |
| p83 | 34 | 10 | 25 |
| q90 | 83 | 9 | 26 |

TABLE 8

| Data Table: Employee_Info | | | |
|---|---|---|---|
| EmpId | Name | Department | Email |
| p83 | Antonie | Research | antonie@example.com |
| q90 | Paxon | Legal | paxon@example.com |

A production user can run the following query (in Table 4) on the production environment 606, which can find the average base salary of the employees per department.

TABLE 4

```
SELECT info.department, AVG(payroll.base) FROM
prod_db.sh1.employee_payroll payroll JOIN
prod_eb.sh2.employee_info info USING payroll.id=info.empId
GROUP BY 1;
```

The administrative (admin) user can perform the following steps (in Table 5) to generate and validate synthetic data. First, the admin user can set up the following development schemas to which the SDG procedure 610 can create tables and store synthetic data.

TABLE 5

```
CREATE DATABASE dev_db;
CREATE SCHEMA sh1;
CREATE SCHEMA sh2;
```

Then, the admin user can invoke the SDG procedure 610 with a relevant input argument and validates quality from the output report of the procedure. The input can comprise an array (e.g., JSON array) specifying configuration for each input table, output table, and join keys. An example of this is provided in Table 6 below.

TABLE 6

```
CALL snowflakedb.local.generate_synthetic_data
(
'{"datasets" :
[{"input_table" : "prod_db.sh1.employee_payroll",
    "output_table" : "dev_db.sh1.employee_payroll_syn",
    "join_keys" : ["id"]},
  {"input_table" : "prod_db.sh2.employee_info",
    "output_table" : "dev_db.sh2.employee_info_syn",
    "join_keys" : ["EmpId"]}]
}');
```

The SDG procedure 610 can generate the following synthetic data tables. Name and Email column can be redacted as they are not specified in the join keys or not categorical. Department can be considered as categorical due to limited cardinality and synthesized accordingly. The "join_keys" can specify columns whose values would be uniquely encoded to a value in the synthesized data.

TABLE 7

| Data Table: Employee_Payroll | | | |
|---|---|---|---|
| ID | Base | Bonus | Stock |
| 100 | 53 | 4 | 43 |
| 200 | 90 | 6 | 10 |

TABLE 8

| Data Table: Employee_Info | | | |
|---|---|---|---|
| EmpId | Name | Department | Email |
| 100 | redacted | Sales | redacted |
| 200 | redacted | Marketing | redacted |

Thereafter, the development (dev) user can run the following production query (in Table 9) in the development development/test environment 608.

TABLE 9

```
SELECT info.department, AVG(payroll.base) FROM
dev_db.sh1employee_payroll_syn payroll JOIN
dev_db.sh2.employee_info_syn info ON payroll.id=info.EmpId
GROUP BY 1;
```

For some embodiments, the syntax for the SDG procedure 610 comprises: CALL snowflake.sdg.generate_synthetic_data(<config>). For various embodiments, the <config> comprises configuration data that the SDG procedure 610 receives as input, and based on which synthetic data is generated. The configuration data can be represented by a data object (referred to herein as a configuration data object).

The following (in Table 10) is a first example of a configuration data object (e.g., <config>) passed to the SDG procedure 610.

TABLE 10

```
CALL snowflake.sdg.generate_synthetic_data(
{
'datasets': [
{
'input_table': 'prod_db.sh.1.employee_payroll',
'output_table' : 'dev_db.sh1.employee_payroll_syn',
'join_keys': ['id']
},
{
'input_table': 'prod_db.sh2.employee_info',
'output_table' : 'dev_db.sh2.employee_info_syn',
'join_keys' : ['EmpId']
}
]
'replace_output_tables': false
});
```

The following (in Table 11) is a second example of a configuration data object passed to the SDG procedure 610.

TABLE 11

```
<config> := {
        "type": "object",
        "properties": {
                "datasets": {
                        "type": "array",
                        "items":
                                {
                                "type": "object",
                                "properties": {
                                        "input_table": {
                                                "type": "string"
                                        },
                                        "output_table:": {
                                                "type": "string"
                                        },
                                        "join_keys": {
                                                "type": "array",
                                                "items": [
                                                        {
                                                        "type": "string"
                                                        }
                                                ]
                                        }
                                }
```

TABLE 11-continued

```
                        },
                        "required": [
                                "input_table",
                                "output_table:",
                                "join_keys"
                                ]
                        }
                },
                "quality_report": {
                        "type": "string"
                }
        },
        "required": [
                "datasets",
                "quality_report"
                ]
        }
```

Based on the first example configuration data object described above, the SDG procedure 610 can generate a new table dev_db.sh1. employee_payroll_syn (616) with the synthetic data generated out of prod_db.sh1. employee_payroll (612), and dev_db.sh2. employee_info_syn (618) with the synthetic data generated out of prod_db.sh2. employee_info (614). An embodiment can treat the id column in the first table, and EmpId in the second, as join keys. For some embodiments, if the argument replace_output_tables is false or missing, and any of the output tables already exists, the SDG procedure 610 will fail. If replace_output_tables is true, the data table can be overwritten.

With respect to privileges, the SDG procedure 610 can be made available as a stored procedure and can be made available to a user who has a specific role (e.g., snowhouse_import.governance_viewer). According to various embodiments, to generate the synthetic data tables, the user has SELECT privilege on the input tables, and CREATE TABLE privilege on the target schema. If any of these privileges are not present, the procedure can fail. For example, when generating output_tables, if any of the tables cannot be created, all tables that have been created in the SDG procedure 610 can be dropped.

As part of running the SDG procedure 610, one or more metrics can be returned as a result of the SDG procedure 610. The following Table 12 illustrates an example format of a metric table that can be returned by the SDG procedure 610. Each row can represent a metric over a generated table.

TABLE 12

| Column Name | Data Type | Description |
| --- | --- | --- |
| CREATED_ON | TIMESTAMP | Time the synthetic data was generated. |
| TABLE_ID | Number | ID of the synthetic table. |
| TABLE_NAME | String | Names of the synthetic table |
| TABLE_SCHEMA | String | Schema name of the synthetic table |
| TABLE_DATABASE | String | Database name of the synthetic table |
| COLUMN_NAME | String | Name of the column of the synthetic table |
| SOURCE_TABLE_ID | Number | ID of the source table. |
| SOURCE_TABLE_NAME | String | Name of the source table |
| SOURCE_TABLE_SCHEMA | String | Schema name of the source table |
| SOURCE_TABLE_DATABASE | String | Database name of the source table |
| SOURCE_COLUMN_NAME | String | Name of the source column |
| METRIC_TYPE | Enum | CORRELATION_COEFFICIENT_DIFFERENCE |
| METRIC_VALUE | Number | The value of the metric |

The following Table 13 provides an alternative format of the metric table, where the METRIC_VALUE comprises an object (e.g., JSON object) whose format is specific to the metric reported.

TABLE 13

| Column Name | Timestamp | Description |
|---|---|---|
| CREATED_ON | Number | Time the synthetic data was generated. |
| TABLE_ID | String | ID of the synthetic table. |
| TABLE_NAME | String | Names of the synthetic table |
| TABLE_SCHEMA | String | Schema name of the synthetic table |
| TABLE_DATABASE | Number | Database name of the synthetic table |
| SOURCE_TABLE_ID | String | ID of the source table. |
| SOURCE_TABLE_NAME | String | Name of the source table |
| SOURCE_TABLE_SCHEMA | String | Schema name of the source table |
| SOURCE_TABLE_DATABASE | String | Database name of the source table |
| SOURCE_COLUMN_NAME | Enum | Name of the source column |
| METRIC_TYPE | Number | CORRELATION_COEFFICIENT_DIFFERENCE |
| METRIC_VALUE | | Json payload of the metric for every column |

Table 13 can be used for different metrics, and each one can have a different METRIC_TYPE.

One metric that can be implemented can be a Correlation Coefficient Difference, which can comprise the difference between the correlation coefficient of every combination of columns in the source table and the same coefficient in the synthetic data table. For this metric, each row can represent the correlation coefficient difference between one combination of columns. The column name pair can be stored in SOURCE_COLUMN_NAME and COLUMN_NAME.

The following Table 14 illustrates an example table for Correlation Coefficient Difference.

TABLE 14

| | | Other columns removed for simplicity | | |
|---|---|---|---|---|
| TABLE_NAME | SOURCE_COL-UMN_NAME | COLUMN_NAME | METRIC_TYPE | METRIC_VALUE |
| employee_pay-roll | years_of_service | income | CORRELATION_COEFFI-CIENT_DIFFERENCE | 0.3 |
| employee_pay-roll | age | years_of_service | CORRELATION_COEFFI-CIENT_DIFFERENCE | −0.1 |

The Correlation Coefficient Difference metrics can be represented as a correlation heatmap, as depicted in FIG. 7. The cells in the heatmap can represent the difference in the correlation coefficient between the corresponding columns on the vertical and horizontal axes, taken as the difference between the correlation in the synthetic data less the correlation in the original data. A larger value (and darker color) can indicate a significant difference in the correlation values for those columns that should be investigated by the user.

To assist in generating an input for the SDG procedure 610, various embodiments comprise a stored procedure for generating input data (e.g., configuration data). For example, an embodiment can provide an input builder stored procedure (e.g., configuration builder) that simplifies the generation of a configuration data object. For instance, the configuration builder can be shown in Table 15.

TABLE 15

```
SET config = null
SET config = SELECT
snowflake.sdg.add_config_dataset($config,
```

TABLE 15-continued

```
input_table=>'prod_db.sh1.employee_payroll',
output_table=>'dev_db.sh1.employee_payroll_syn',
```

20

TABLE 15-continued

```
    join_keys=>['id']
);
SET config - SELECT
snowflake.sdg.add_config_dataset($config,
    input_table=> 'prod_eb.sh2.employee_info',
    output_table=> 'dev_db.sh2.employee_info_syn',\
    join_keys=>['EmpID']
);
CALL snowflake.sdg.generate_synthetic_data($config);
```

The configuration builder can be configured to receive one or more of the following parameters: config—a session variable that holds the config user has specified yet; input_table—the original table to be used by the SDG procedure 610; output_table—the result table with synthesized data; and join_keys(a list of keys)—the keys that are being joined on.

The following checks can be performed on the input arguments. For example, in the input_table, a user can input either a fully qualified name, or unqualified name. The check can confirm that a fully qualified name is received. The check can fail if the input_table doesn't exist. 2. As another example, in the output_table, a user can input either a fully qualified name, or unqualified name, and the check can fail if the output_table already exists in the target location. As another example, for the join_keys, every column can be checked to exist in the input_table. The following Table 16 describes the example checks based on the field.

TABLE 16

| Field | User input | Output for User | Requirements |
|---|---|---|---|
| <input_table> | 1. Unqualified name 2. Fully-qualified name | Always return fully-qualified name | <input_table> must exist |
| <output_table> | 1. Unqualified name 2. Fully-qualified name | Always return fully-qualified name | 1. <output_table> must not exist 2. If fully-qualified, DB and Schema must exist |
| <join_keys> | An array of columns | An array of columns same as user input | Every column in <join_keys> must exist in the <input_table> |

For some embodiments, a user creates a bundle and interacts with it to generate the synthetic data. and obtain the output tables and reports. For example, as shown in Table 17 below:

TABLE 17

```
CREATE SNOWFLAKE.SDG.SYNTHETIC_DATA generator( ); --
Instantiate the bundle
CALL generator!GENERATE('prod_db.sh1.employee_payroll'); --
Generate synthetic data based on the input table.
SELECT
generator!GENERATED_TABLE('prod_db.sh2.employee_payroll');
-- Get the generated data for a table.
SELECT generator!SHOW_QUALITY_REPORT( ); -- Display quality
report
```

For some embodiments, a user calls the SDG procedure 610 as a stored procedure where (instead of specifying the name of the output) the user passes a reference to an output table. The passed references can have the insert and truncate privilege, and the tables can exist prior to calling the stored procedure. An example of this is shown in Table 18 below.

TABLE 18

```
CALL snowflakedb.sdg.generate_synthetic_data(
{
'datasets': [
{
'input_table': 'prod_db.sh2.employee_payroll',
'output_table' : SYSTEM$REFERENCE('TABLE' ,
'dev_db.sh1.employee_payroll_syn', 'CALL', 'INSERT')),
''join_keys': ['id']
},
{
'input_table': 'prod_db.sh2.employee_info',
'output_table' : SYSTEM$REFERENCE('TABLE',
'dev_db.sh2.employee_payroll_syn', 'CALL', 'INSERT')),
''join_keys': ['EmpId']
}
]
});
```

Some embodiments provide an SDG workload producer function that can reduce manual efforts to create a development environment for a given production environment and to create the input for the SDG procedure 610. The SDG workload producer function can achieve statistical similarity across tables, provide semi-structured and unstructured data support, achieve differential privacy for SDG, achieve statistical similarity for AI/ML use cases, integrate classification into a workflow, provide time series data support, and provide a data generator model as an artifact exposed to a user.

According to some embodiments, the SDG workload producer function automates the steps of: dev/test environment setup (where a user creates a similar artifact of the production environment); and generate input (e.g., configuration object) for the SDG procedure 610 (where a user inspects a SQL query and identifies workloads for the procedure). A user (e.g., admin user) can pass query to the SDG workload producer function (e.g., SYNTHETIC_WORKLOAD_GENERATOR) and a dev/test database name, and the function can output one or more of the following: DDLs for the dev artifacts that was used in the give query; one or more CALL statements to the SDG procedure 610 with proper arguments (e.g., source tables, join keys, tables in dev); and a query similar to the given query that can be run in the dev environment.

The following Table 19 represents an example of an admin user calling the SDG workload producer function (e.g., SYNTHETIC_WORKLOAD_GENERATOR) with a query that they run in the production environment 606.

TABLE 19

```
SELECT
SYNTHETIC_WORKLOAD_GENERATOR(query_refernece=>SYSTEM$QUERY_
REFERENCE("SELECT department, AVG(base) FROM
prod_db.sh1.employee_payroll JOIN prod_db.sh2.employee_info
USING id GROUP BY 1", test_db_name=>'dev_db')
```

As a result, the SDG workload producer function can produce the following example output as shown in following Table 20.

TABLE 20

```
CREATE SCHEMA sh1;
CREATE SCHEMA sh2;
CREATE TABLE employee_payroll_syn like
prod_db.sh1.employee_payroll;
CREATE TABLE employee_info_syn like
prod_db.sh2.employee_info;
CALL generate_synthetic_data
(
synthetic_data_input_config(
input_table=>'prod_db.sh1.employee_payroll',
join_columns => 'id',
output_table => 'dev_db.sh2.employee_payroll_syn'),
synthetic_data_input_config(
input_table=>'prod_db.sh2.employee_info',
join_columns => 'id',
output_table => 'dev_db.sh2.employee_payroll_syn'),
));
SELECT department, AVG(base) FROM
dev_db.sh1.employee_payroll_syn JOIN
dev_db.sh2.employee_info_syn USING id GROUP BY 1;
```

The admin user can execute the script to set up the development/test environment 608 and then validate and share the final query with a target user.

Depending on the embodiment, the synthetic data algorithm definition implementing the SDG procedure 610 can achieve statistical similarity within a table, achieve statistical similarity across tables, achieve referential integrity, achieve privacy measure compliance, support differentially privacy, support numeric, Boolean, date/time and categorical data types, provide scalability, achieve computationally efficiency, achieve AI/ML inference similarity, support binary, semi-structured, text, geospatial, achieve format preservation, or some combination thereof.

Synthetic data generator of the SDG procedure 610 can comprise one or more of the following: Copulas (probabilistic models that capture univariate distributions of attributes and the correlations across them); probabilistic graphical models (PGMs); generative adversarial networks (GANs); and variational autoencoders (VAEs). Different types of Copulas can include Multivariate Copulas, Conditional Copulas, and Vine Copulas. Examples of PGMs can include Bayesian Networks and Markov Random Fields. GANs can comprise a type of neural network that has two sub-models: a generator and a discriminator. The generator can generate synthetic data, while the discriminator can evaluate the authenticity of the generated data by comparing it to real data. The two sub-models can be trained together in an adversarial process where the generator tries to generate realistic data to convince the discriminator that it is real. VAEs can comprise an encoder network that takes the data and maps it into a probability distribution, and a decoder that takes a point and maps it back to the data space. The parameters for the encoder and decoder can be learned during training which minimizes reconstruction loss.

For privacy compliance, the synthetic data algorithm can use constraints to ensure that the generated data satisfies DCR and NNDR thresholds.

To incorporate referential integrity, the synthetic data algorithm can generate a synthetic key mapping that will apply a unique value for each unique key value across the tables input into the synthetic data generator. For privacy checks, the algorithm can calculate the following metrics between the synthetic and original datasets: 1. The minimum distance to closest record; 2. The fifth percentile of DCR; and 3. the fifth percentile of nearest neighbor distance ratio NNDR. Three things can be checked to consider the synthetic data to be privacy preserving: 1. The minimum DCR is >0, there are caveats to this based on the cardinality of the original dataset; 2. fifth percentile DCR of synthetic to original>fifth percentile DCR of original to itself; and 3. fifth percentile NNDR of synthetic to original>fifth percentile NNDR of original to itself. The first one can ensure that no record is replicated, the second one can ensure that the synthetic data is not too close to the original, and the third one can ensure that outliers in the original data arc not replicated. If these measures fail, the algorithm can provide guidance to users on how they can pass them (e.g., generate more data, remove outliers, etc.).

For some embodiments, the synthetic data algorithm can comprise the following specifics. Input of the algorithm can comprise a (original or source) table/view/materialized view with join key specifications for which the referential integrity will be preserved. Output of the algorithm can comprise a (synthetic data) table that preserves the join-key columns with referential integrity constraints. At a first step, a mapping function is created to transform keys into integers. During the first step, 1. unique key values are collected from all join key columns, and 2. a function is created that will map each unique key to a unique integer.

At a second step, data is prepared for synthesis. During the second step, 3. each join key column is processed separately using a mapping function to generate consistent integers, and 4. all remaining columns are transformed into floats and the transformation is kept so that various embodiments can reverse it at the end.

At a third step, univariate and multivariate statistical properties are found. During the third step, 5. univariate distributions are computed for each column, and 6. the correlation matrix of the input data is computed (e.g., using Kendall, Spearman or Pearson coefficients). Sub-step 5 can be performed parametrically or non-parametrically (where parametric examples include known distributions such as uniform, beta, gamma, gaussian, etc., and non-parametric examples include gaussian-kde or empirical). Sub-step 5 can choose a default one to always use or can allow the algorithm to attempt all and choose the one with the best Kolmogorv-Smirnov statistic and p-value.

At a fourth step, the copula is sampled to produce synthetic data. During the fourth step, 7. a multivariate normal random variable with mean=0 and covariance matrix equal to the correlation matrix above is sampled. During the fourth step, 8. for each column, a. the cumulative distribution function is computed from those samples, and b. the cumulative distribution function (percentile point function) of the fitted univariate distribution for the column is inverted. Eventually, during fourth step, 9. transformation from step two is reversed.

At a fifth step, the synthetic data is merged with the join key and the result is output. During the fifth step, 10. the join key column is merged with synthetic data.

With respect to SDQ quality metrics, one or more metrics can be used to measure one or more of fidelity, utility, and privacy from data generated synthetically from existing tabular data. Meaning that if we have an existing original dataset and we generate a new one synthetically from it, metrics can indicate how similar the synthetic dataset is to the existing original dataset. The following details different metrics that can be generated or reported by various embodiments described herein.

Fidelity—This metric is measured in terms of how well the synthetic data matches the original data on the following measures. Example fidelity metrics include, without limitation, column statistical similarity, cardinality (e.g., multiple tables only), category replication, range replication, boundary observance, correlation matrix, and contingency similarity. Industry metrics used to measure fidelity can include one or more of the following: statistic similarity; Kolmogorov-Smirnov, TVD (Total Variation Distance); Chi-squared Test; category and range Completeness; boundary preservation; incomplete data similarity; correlation and contingency coefficients; cardinality shape similarity; missing value similarity; and mutual information.

Column Statistical Similarity—This metric determines the distance between the probability distributions of the original and synthetic datasets. A user can compare the histograms (e.g., using streamlit). For numeric or datetime columns, the Kolmogorov-Smirnov(KS) test can be used, while the Total Variation Distance(TVD) can be used for Boolean and categorical columns. The KS test can be calculated by: 1. converting datetime columns to numeric values; 2. calling ks_2samp from the Scipy stats package; and 3. assuming a 95% confidence level, the p-value must be greater than 0.05 to be able to say that the distributions are similar, this aligns with a low value of the ks statistic. Both the ks statistic and the p-value are reported. The TVD can be calculated by: 1. calculating a probability distribution function for the columns that are being compared; 2.

$$TVD = \frac{1}{2}\sum |original.pdf - synthetic.pdf|;$$

and 3. the smaller the value the closer the two distributions are.

Cardinality Replication—In a relational database, this metric means the number of connections (joins) between primary and foreign keys in different tables. If primary and foreign keys are not defined then the identified join keys will be used. This metric is applicable to multiple table use cases. It can calculate the number of connections in the synthetic dataset relative to the number of connections in the original per key, and it can sum the connections over all keys and divide them by the number of keys. If cardinality in the synthetic dataset matched the original this metric will be 1. Equation 1 below represents an example equation for calculating cardinality replication.

$$Cardinality\ Replication = \frac{1}{key}\sum_{key} \frac{synthetic\ number\ of\ connections}{original\ number\ of\ connections}$$

Correlation Matrix—This metric can measure the degree to which two numeric variables move together; it can capture linear relationships. This metric can compute a Pearson correlation coefficient for each pair of attributes with a value between [−1, 1]. A coefficient of +1 can mean the two attributes are positively correlated and a value of −1 can mean that the two attributes are negatively correlated. Equation 2 below represents an example equation used to generate a correlation matrix.

$$\rho_{X,Y} = \frac{cov(X, Y)}{\sigma_X \sigma_Y}$$

This metric can be calculated for the numeric columns in the original dataset and the synthetic dataset; the difference of the matrices can highlight which correlations were not captured.

Category Replication—For each Boolean and categorical variable, this metric can measure the number of unique values replicated from the original in the synthetic column will be reported as a number between 0 and 1. Equation 3 below represents an example equation for calculating category replication.

$$Cardinality\ Replication = \frac{(number\ of\ original\ categories\ in\ synthetic)}{(number\ of\ original\ categories)}$$

Range Replication—For each numeric and datetime (e.g., date, time, and timestamp data types) column, this metric can be compared between the original and synthetic datasets and reported as a number between 0 and 1. If range replication is less than 1 but more than 0, the metric can represent the percent of the range that is covered by the synthetic data. Equation 4 below represents an example equation and logic for calculating range replication.

$$\text{if } max(original) - min(original) \ne 0 \text{ then}$$

$$Range\ Replication =$$

$$max\left(\frac{min(max(synthetic),\ max(original)) - max(min(synthetic),\ min(original))}{max(original) - (original)},\ 0\right)$$

$$\text{else}$$

$$Range\ Replication = 1$$

Range replication can equal 1 if the original datasets range is 0; this is because the distribution can contain that singular value and all synthetic values can be the same value, thereby fully spanning the range.

Boundary Observance—For each numeric and datetime column, this metric comprises the minimum and maximum values of each original column compared to the synthetic. If a column's values are within that range then it returns a 1, if it has values outside of that range then the fraction that is inside is reported. Equation 7 below represents an example equation for calculating boundary observance.

$$Boundary\ Observance =$$

$$\frac{1}{nrows}\sum_{i=1}^{nrows} \text{if } min(original_i) \le synthetic_i \le max(original_i)$$

Contingency Similarity—This metric can measure the similarity between categorical and Boolean columns between the original dataset and the synthetic dataset. A value of 1 can mean that there is high similarity between the contingency tables for the pair of attributes, whereas a value of 0 can mean that there is no similarity. The computation can be performed by the following Equation 6:

$$Contingency\ Similarity = 1 - \frac{1}{2}\sum_{\alpha:\ A}\sum_{\beta:\ B} |S_{\alpha,\beta} - R_{\alpha,\beta}|$$

Columns A and B are categorical or Boolean attributes and $\alpha$ is the possible categories of A and $\beta$ is the possible categories of B. S is the synthetic dataset and R is the real or original dataset.

Utility—This metric can measure how well models trained on the synthetic data compares to the original. Industry utility metrics used can include, without limitation, prediction score; feature importance score; and QScore.

Privacy—This metric can measure how well synthetic data prevents disclosure of private information such as identities or personal data. Industry privacy metrics can include, without limitation, exact match score (how many rows are in common and how many rows are new), DCR, and NNDR.

Number of Replicated and Novel Rows—This metric expresses how many rows as a percentage have been replicated and how many are completely new. Numeric and datetime will utilize a threshold when comparing as these data types may have a slight difference. Equation 7 below represents an example equation for calculating replicated rows.

$$Replicated\ Rows = \frac{matching\ synthetic\ rows}{total\ synthetic\ rows}$$

Equation 9 below represents an example equation for calculating novel rows.

$$Novel\ Rows = 1 - Replicated\ Rows$$

Having nonzero replicated rows may or may not imply a privacy leakage. It does depend on the data, for example if your data has a small domain then it would be expected to have replicated rows.

Uniqueness—This metric measures the number of unique rows in the original and synthetic datasets. If the synthetic dataset has less, then there are potential rows missing that may allow an attacker to guess the unique combination. Equation 9 below represents an example equation for calculating uniqueness.

$$Uniqueness =$$
$$\frac{number\ of\ unique\ synthetic\ rows}{number\ of\ synthetic\ rows} \times \frac{number\ of\ original\ rows}{number\ of\ unique\ original\ rows}$$

If this metric is close to or greater than 1, then there is approximately the same percentage of unique rows in the synthetic dataset. This is to address scenarios where users may think by removing outliers they have improved privacy, but have really created unique combinations that should be part of the dataset.

Distance to Closest Record (DCR)—This metric can measure distances between synthetic records and original records. This metric can be computed by: 1. taking a holdout from the original dataset; 2. computing the k nearest neighbors between: a. the holdout to the original and b. the holdout to the original synthetic; and 3. then determining if the distances for the synthetic to the holdout is closer than the holdout is to the original.

Nearest Neighbor Distance Ratio (NNDR)—This metric uses the nearest neighbors distances computed for DCR and finds the ratio between the first and second nearest neighbor distances. The distance ratios for the holdout to the original and the holdout to the synthetic may be similar.

With respect to format preservation, various embodiments use one or more masking policies to preserve format of certain columns, such as email address, phone number, etc. when generating synthetic data. The following describes example scenarios for format preservation.

Referring now to a first example scenario, at a first step, a user with role data_owner has a table emp_info created according to Table 21 below.

TABLE 21

```
create database data_db;
create schema sh;
create or replace table emp_info(id number, email string,
phone string);
insert into emp_info values (1, 'alice@gmail.com', '512-
222-1111'), (2, 'bob@msn.com', '512-333-1111'), (3,
'carol@msn.com', '512-433-3333'), (4, 'david@gmail.com',
'415-222-1111'), (4, 'evan@gmail.com', '415-333-1111'), (5,
'frank@msn.com', '415-333-5555');
```

At step two, the user generates synthetic data using the SDG procedure, as shown in Table 22 below.

TABLE 22

```
call snowflake.data_privacy.GENERATE_SYNTHETIC_DATA({
'datasets': [
  {
    'input_table': 'data_db.sh.emp_Info',
    'output_table' : 'data_dh.sh.emp_info_syn',
      'join_keys': ['ID']
  }
]
'replace_output_tables': true
});
```

The emp_info_syn will now contain (e.g., store) the synthetic data, where email and phone columns will be considered as identifier and replaced with redacted text as shown in Table 23 below.

TABLE 23

| Row | ID | EMAIL | PHONE |
|-----|-----|--------------|--------------|
| 1 | 0 | redacted | redacted |
| 2 | 1 | redacted | redacted |
| 3 | 2 | redacted | redacted |
| 4 | 3 | redacted | redacted |
| 5 | 4 | redacted | redacted |
| 6 | 5 | redacted | redacted |

Now, the user may want to preserve the format for the email column by displaying the email provider for their analysis. In order to do that, the user can create an email_mask masking policy and attach the policy to the email column. email_mask can be configured to partially mask the column to preserve email provider name and format. An example of this is shown below in Table 24.

TABLE 24

```
create or replace masking policy email_mask as (val string)
returns string -> CASE
WHEN true THEN concat('****', substr(val, REGEXP_INSTR(val,
'@#') + 1))
END
alter table emp_info modify column email set masking policy
email_mask;
select * from emp_info;
call snowflake.data_privacy.GENERATE_SYNTHETIC_DATA({
    'datasets': [
        {
            'input_table':
'data_db.sh.Emp_Info',
            'output_table' :
'data_db_sh_emp_info_syn',
            'join_keys':
['ID']
        }
    ]
    'replace_output_tables': true
});
```

The emp_info_syn can contain (e.g., store) the following data that preserves the format of email column. as shown below in Table 25.

TABLE 25

| Row | ID | EMAIL | PHONE |
|---|---|---|---|
| 1 | 0 | **gmai.com | redacted** |
| 2 | 1 | **gmai.com | redacted** |
| 3 | 2 | **gmai.com | redacted** |
| 4 | 3 | **gmai.com | redacted** |
| 5 | 4 | **gmai.com | redacted** |
| 6 | 5 | **gmai.com | redacted** |

In the example second scenario, if the user wants to have plaintext access when selecting the emp_info table using data_owner role and preserving format using partial masking when generating synthetic data, the user can achieve that by using the following workflow.

At step one, a role sdg_partial_mask_generator for generating format preservation is created and granted the role to the user, as shown below in Table 26.

TABLE 26

```
create role sdg_partial_mask_generator;
grant role sdg_partial_mask_generator to user snowman;
```

At step two, the masking policy is updated to ensure that the format preservation partial mask is applied when sdg_partial_mask_generator is activated, as shown below in Table 27.

TABLE 27

```
alter masking policy email_mask set body ->
CASE
WHEN is_role_in_session('SDG_PARTIAL_MASK_GENERATOR')
THEN
substr(val,
REGEXP_INSTR(val, '@') + 1)
WHEN current_role( ) = 'DATA_OWNER' THEN val
ELSE 'xxxx'
END;
```

Now, when the user runs synthetic data generation (as shown below in Table 28) without activating the role sdg_partial_mask_generator, the synthetic data will not preserve the format, as shown below in Table 29.

TABLE 28

```
call snowflake.data_privacy.GENERATE_SYNTHETIC_DATA({
'datasets': [
{
'input_table': 'data_db.sh.Emp_Info',
'output_table' : 'data_db.sh.emp_info_syn',
'join_keys': ['ID']
}
'replace_output_tables': true
});
```

TABLE 29

| Row | ID | EMAIL | PHONE |
|---|---|---|---|
| 1 | 0 | redacted | redacted |
| 2 | 1 | redacted | redacted |
| 3 | 2 | redacted | redacted |
| 4 | 3 | redacted | redacted |
| 5 | 4 | redacted | redacted |
| 6 | 5 | redacted | redacted |

Now, sdg_partial_mask_generator can be activated as a secondary role in the session and generate the synthetic data (as shown below in Table 30), and the output can contain (e.g., store) the format preserving email, as shown below in Table 31.

TABLE 30

```
use secondary role SDG_PARTIAL_MASK_GENERATOR;
call snowflake.data_privacy.GENERATE_SYNTHETIC_DATA({
'datasets': [
{
'input_table': 'data_dh.sh.Emp_Info',
'output_table' : 'data_db.sh.emp_info_syn',
'join_keys': ['ID']
}
],
'replace_output_tables': true
});
```

TABLE 31

| Row | ID | EMAIL | PHONE |
|---|---|---|---|
| 1 | 0 | **gmai.com | redacted** |
| 2 | 1 | **gmai.com | redacted** |
| 3 | 2 | **gmai.com | redacted** |
| 4 | 3 | **gmai.com | redacted** |
| 5 | 4 | **gmai.com | redacted** |
| 6 | 5 | **gmai.com | redacted** |

The following Table 32 provides an example of a METRIC_VALUE schema for CORRELATION_MISMATCH type.

TABLE 32

```
{
[
"MISMATCH_COLUMN_:

[
{ "SYN_COLUMNS" : (col1, col2),
"SYC_CORELATION_COEFFICIENT": 0.6,
"SRC_COLUMNS" : (col3, col4),
"SRCL_CORELATION_COEFFICIENT": 0/8,
},
{
. . . .
}
]
]
}
```

Figure 8:
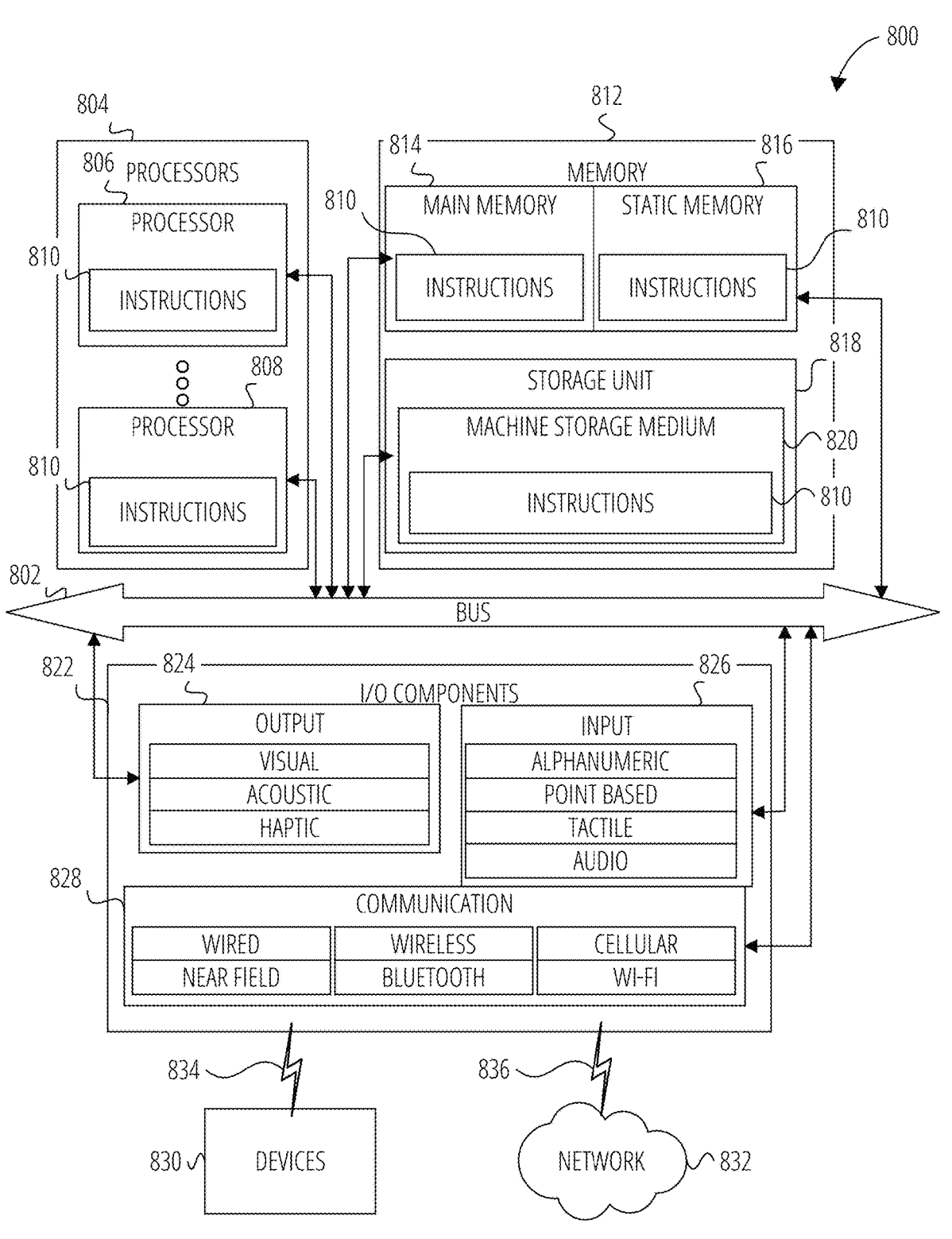
FIG. 8 illustrates a diagrammatic representation of a machine in the form of a computer system within which a set of instructions can be executed for causing the machine to perform any one or more of the methodologies discussed herein, according to some embodiments of the present disclosure.

FIG. 8 illustrates a diagrammatic representation of a machine 800 in the form of a computer system within which a set of instructions can be executed for causing the machine 800 to perform any one or more of the methodologies discussed herein, according to some embodiments of the present disclosure. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein can be executed. For example, the instructions 810 may cause the machine 800 to execute any one or more operations of any one or more of the methods described herein. As another example, the instructions 810 may cause the machine 800 to implement portions of the data flows described herein. In this way, the instructions 810 transform a general, non-programmed machine into a particular machine 800 (e.g., the compute service manager 106, the execution platform 108, client device 112) that is specially configured to carry out any one of the described and illustrated functions in the manner described herein.

In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines machine 800 that individually or jointly execute the instructions 810 to perform any one or more of the methodologies discussed herein.

The machine 800 includes processors 804, memory 812, and input/output (I/O) components 822 configured to communicate with each other such as via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 806 and a processor 808 that may execute the instructions 810. The term "processor" is intended to include multi-core processors 804 that may comprise two or more independent processors (sometimes referred to as "cores") that may execute instructions 810 contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory 812 may include a main memory 814, a static memory 816, and a storage unit 818, all accessible to the processors 804 such as via the bus 802. The main memory 814, the static memory 816, and the storage unit 818 comprising a machine storage medium 820 may store the instructions 810 embodying any one or more of the methodologies or functions described herein. The instructions 810 may also reside, completely or partially, within the main memory 814, within the static memory 816, within the storage unit 818, within at least one of the processors 804 (e.g., within the processor's cache memory), or any suitable combination thereof, during execution thereof by the machine 800.

The I/O components 822 include components to receive input, provide output, produce output, transmit information, exchange information, capture measurements, and so on. The specific I/O components 822 that are included in a particular machine 800 will depend on the type of machine. For example, portable machines such as mobile phones will likely include a touch input device or other such input mechanisms, while a headless server machine will likely not include such a touch input device. It will be appreciated that the I/O components 822 may include many other components that are not shown in FIG. 8. The I/O components 822 are grouped according to functionality merely for simplifying the following discussion and the grouping is in no way limiting. In various example embodiments, the I/O components 822 may include output components 824 and input components 826. The output components 824 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 822 may include communication components 828 operable to couple the machine 800 to a network 832 via a coupling 836 or to devices 830 via a coupling 834. For example, the communication components 828 may include a network interface component or another suitable device to interface with the network 832. In further examples, the communication components 828 may include wired communication components, wireless communication components, cellular communication components, and other communication components to provide communication via other modalities. The devices 830 can be another machine or any of a wide variety of peripheral devices (e.g., a peripheral device coupled via a universal serial bus (USB)). For example, as noted above, the machine 800 may correspond to any client device, the compute service manager 106, the execution platform 108, and the devices 830 may include any other of these systems and devices.

The various memories (e.g., 812, 814, 816, and/or memory of the processor(s) 804 and/or the storage unit 818) may store one or more sets of instructions 810 and data structures (e.g., software) embodying or utilized by any one or more of the methodologies or functions described herein. These instructions 810, when executed by the processor(s) 804, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 832 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 832 or a portion of the network 832 may include a wireless or cellular network, and the coupling 836 can be a Code Division Multiple Access (CDMA) connection, a Global System for Mobile communications (GSM) connection, or another type of cellular or wireless coupling. In this example, the coupling 836 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 810 can be transmitted or received over the network 832 using a transmission medium via a network interface device (e.g., a network interface component included in the communication components 828) and utilizing any one of a number of well-known transfer protocols (e.g., hypertext transfer protocol (HTTP)). Similarly, the instructions 810 can be transmitted or received using a transmission medium via the coupling 834 (e.g., a peer-to-peer coupling) to the devices 830. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 810 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: creating, based on user input, a target table of a target database; receiving a call to perform a synthetic data generation procedure with a set of input parameters, the set of input parameters comprising: a first parameter that specifies a source table of a source database that stores original data; and a second parameter that specifies a set of join key columns of the source table; and performing the synthetic data generation procedure, the synthetic data generation procedure comprises: accessing at least a portion of the original data from the source table; generating synthetic data that comprises new data artificially generated based on the original data and the set of join key columns, the new data being artificially generated such that the new data is different from the original data while preserving statistical similarity to the original data and while preserving referential integrity of the new data among columns of the original data; and storing the synthetic data in the target table of the target database based on the set of join key columns.

In Example 2, the subject matter of Example 1 includes, wherein the synthetic data generation procedure comprises: generating a set of quality metrics for the synthetic data generated based on the original data.

In Example 3, the subject matter of Example 2 includes, wherein the call is received from a client device, and wherein the synthetic data generation procedure comprises: returning, to the client device, the set of quality metrics as a metric table.

In Example 4, the subject matter of Examples 2-3 includes, wherein the set of metrics comprises a set of fidelity measures to evaluate how well statistics in the synthetic data match statistics in the original data.

In Example 5, the subject matter of Examples 2-4 includes, wherein the set of metrics comprises a set of privacy measures, the set of privacy measures comprising at least one of a Distance to Closest Record (DCR) or a Nearest Neighbor Distance Ratio (NNDR).

In Example 6, the subject matter of Examples 1-5 includes, wherein the generating of the synthetic data comprises artificially generating the new data, and wherein the generating of the new data comprises: determining a set of unique key values from the set of join key columns of the source table; mapping the set of unique key values to a set of unique integer values in a set of corresponding join key columns of an intermediate table; transforming values in one or more non-join key columns of the source table to float values in one or more corresponding non-join key columns of the intermediate table; determining one or more statistical properties for one or more columns of the intermediate table; determining a correlation matrix based on the one or more statistical properties; generating a probabilistic model based on the one or more statistical properties and the correlation matrix; and sampling a random variable of the probabilistic model to generate the new data.

In Example 7, the subject matter of Example 6 includes, wherein the mapping is performed by a function, and wherein the generating of the new data comprises: generating the function configured to map a select unique key value to a select unique integer.

Example 8 is a method to implement any of Examples 1-7.

Example 9 is a machine-storage medium storing instructions that when executed by a machine, cause the machine to perform operations to implement any of Examples 1-7.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one processor; and
   at least one memory storing instructions that cause the at least one processor to perform operations comprising:
      creating, based on user input, a target table of a target database;

receiving a call to perform a synthetic data generation procedure with a set of input parameters, the set of input parameters comprising:
         a first parameter that specifies a source table of a source database that stores original data; and
         a second parameter that specifies a set of join key columns of the source table;
      performing the synthetic data generation procedure, the synthetic data generation procedure comprises:
         accessing at least a portion of the original data from the source table;
         generating synthetic data that comprises new data artificially generated based on the original data and the set of join key columns, the new data being artificially generated such that the new data is different from the original data while preserving statistical similarity to the original data and while preserving referential integrity of the new data among columns of the original data, the generating of the new data comprising:
            mapping a set of unique key values, from the set of join key columns of the source table, to a set of unique integer values in a set of corresponding join key columns of an intermediate table;
            transforming values in one or more non-join key columns of the source table to float values in one or more corresponding non-join key columns of the intermediate table;
            determining a correlation matrix based on one or more statistical properties for one or more columns of the intermediate table;
            generating a probabilistic model based on the one or more statistical properties and the correlation matrix; and
            sampling a random variable of the probabilistic model to generate the new data; and
         storing the synthetic data in the target table of the target database based on the set of join key columns;
      using at least a portion of stored synthetic data from the target table to perform a training operation on an artificial intelligence model, the training operation yielding results similar to those obtained using the original data to perform the training operation on the artificial intelligence model; and
      computing one or more utility metrics that measure how well the artificial intelligence model trained on the synthetic data compares to another artificial intelligence model trained on the original data.

2. The system of claim 1, wherein the synthetic data generation procedure comprises:
   generating a set of quality metrics for the synthetic data generated based on the original data.

3. The system of claim 2, wherein the call is received from a client device, and wherein the synthetic data generation procedure comprises:
   returning, to the client device, the set of quality metrics as a metric table.

4. The system of claim 2, wherein the set of metrics comprises a set of fidelity measures to evaluate how well statistics in the synthetic data match statistics in the original data.

5. The system of claim 2, wherein the set of metrics comprises a set of privacy measures, the set of privacy measures comprising at least one of a Distance to Closest Record (DCR) or a Nearest Neighbor Distance Ratio (NNDR).

6. The system of claim 1, wherein the mapping is performed by a function, and wherein the generating of the new data comprises:

generating the function configured to map a select unique key value to a select unique integer.

7. A method comprising:

creating, by at least one processor and based on user input, a target table of a target database;

receiving, by the at least one processor, a call to perform a synthetic data generation procedure with a set of input parameters, the set of input parameters comprising:

a first parameter that specifies a source table of a source database that stores original data; and a second parameter that specifies a set of join key columns of the source table;

performing, by the at least one processor, the synthetic data generation procedure, the synthetic data generation procedure comprises:

accessing at least a portion of the original data from the source table;

generating synthetic data that comprises new data artificially generated based on the original data and the set of join key columns, the new data being artificially generated such that the new data is different from the original data while preserving statistical similarity to the original data and while preserving referential integrity of the new data among columns of the original data, the generating of the new data comprising:

mapping a set of unique key values, from the set of join key columns of the source table, to a set of unique integer values in a set of corresponding join key columns of an intermediate table;

transforming values in one or more non-join key columns of the source table to float values in one or more corresponding non-join key columns of the intermediate table;

determining a correlation matrix based on one or more statistical properties for one or more columns of the intermediate table;

generating a probabilistic model based on the one or more statistical properties and the correlation matrix; and sampling a random variable of the probabilistic model to generate the new data; and storing the synthetic data in the target table of the target database based on the set of join key columns;

using, by the at least one processor, at least a portion of stored synthetic data from the target table to perform a training operation on an artificial intelligence model, the training operation yielding results similar to those obtained using the original data to perform the training operation on the artificial intelligence model; and computing, by the at least one processor, one or more utility metrics that measure how well the artificial intelligence model trained on the synthetic data compares to another artificial intelligence model trained on the original data.

8. The method of claim 7, wherein the synthetic data generation procedure comprises:

generating a set of quality metrics for the synthetic data generated based on the original data.

9. The method of claim 8, wherein the call is received from a client device, and wherein the synthetic data generation procedure comprises:

returning, to the client device, the set of quality metrics as a metric table.

10. The method of claim 8, wherein the set of metrics comprises a set of fidelity measures to evaluate how well statistics in the synthetic data match statistics in the original data.

11. The method of claim 8, wherein the set of metrics comprises a set of privacy measures, the set of privacy measures comprising at least one of a Distance to Closest Record (DCR) or a Nearest Neighbor Distance Ratio (NNDR).

12. The method of claim 7, wherein the mapping is performed by a function, and wherein the generating of the new data comprises:

generating the function configured to map a select unique key value to a select unique integer.

13. A machine-storage medium, the machine-storage medium including instructions that when executed by a machine, cause the machine to perform operations comprising:

creating, based on user input, a target table of a target database;

receiving a call to perform a synthetic data generation procedure with a set of input parameters, the set of input parameters comprising:

a first parameter that specifies a source table of a source database that stores original data; and a second parameter that specifies a set of join key columns of the source table;

performing the synthetic data generation procedure, the synthetic data generation procedure comprises:

accessing at least a portion of the original data from the source table;

generating synthetic data that comprises new data artificially generated based on the original data and the set of join key columns, the new data being artificially generated such that the new data is different from the original data while preserving statistical similarity to the original data and while preserving referential integrity of the new data among columns of the original data, the generating of the new data comprising:

mapping a set of unique key values, from the set of join key columns of the source table, to a set of unique integer values in a set of corresponding join key columns of an intermediate table;

transforming values in one or more non-join key columns of the source table to float values in one or more corresponding non-join key columns of the intermediate table;

determining a correlation matrix based on one or more statistical properties for one or more columns of the intermediate table;

generating a probabilistic model based on the one or more statistical properties and the correlation matrix; and sampling a random variable of the probabilistic model to generate the new data; and storing the synthetic data in the target table of the target database based on the set of join key columns;

using at least a portion of stored synthetic data from the target table to perform a training operation on an artificial intelligence model, the training operation yielding results similar to those obtained using the original data to perform the training operation on the artificial intelligence model; and computing one or more utility metrics that measure how well the artificial intelligence model trained on the synthetic data compares to another artificial intelligence model trained on the original data.

14. The machine-storage medium of claim 13, wherein the synthetic data generation procedure comprises:

generating a set of quality metrics for the synthetic data generated based on the original data.

15. The machine-storage medium of claim 14, wherein the call is received from a client device, and wherein the synthetic data generation procedure comprises:

returning, to the client device, the set of quality metrics as a metric table.

16. The machine-storage medium of claim 14, wherein the set of metrics comprises a set of fidelity measures to evaluate how well statistics in the synthetic data match statistics in the original data.

17. The machine-storage medium of claim 14, wherein the set of metrics comprises a set of privacy measures, the set of privacy measures comprising at least one of a Distance to Closest Record (DCR) or a Nearest Neighbor Distance Ratio (NNDR).

18. The machine-storage medium of claim 13, wherein the generating of the synthetic data comprises artificially generating the new data, and wherein the generating of the new data comprises:

determining a set of unique key values from the set of join key columns of the source table;

mapping the set of unique key values to a set of unique integer values in a set of corresponding join key columns of an intermediate table;

transforming values in one or more non-join key columns of the source table to float values in one or more corresponding non-join key columns of the intermediate table;

determining one or more statistical properties for one or more columns of the intermediate table;

determining a correlation matrix based on the one or more statistical properties;

generating a probabilistic model based on the one or more statistical properties and the correlation matrix; and sampling a random variable of the probabilistic model to generate the new data.

19. The machine-storage medium of claim 13, wherein the synthetic data generation procedure comprises:

generating a set of quality metrics for the synthetic data generated based on the original data.

20. The machine-storage medium of claim 13, wherein the mapping is performed by a function, and wherein the generating of the new data comprises:

generating the function configured to map a select unique key value to a select unique integer.

* * * * *